May 21, 1968 G. D. BUKOVICH ET AL 3,384,317

TAPE HANDLER APPARATUS

Filed Jan. 3, 1966

INVENTORS
GEORGE D. BUKOVICH
DAVID W. OLSEN

BY Joseph A. Speldrich
AGENT

United States Patent Office 3,384,317

Patented May 21, 1968

3,384,317

TAPE HANDLER APPARATUS

George D. Bukovich, Minneapolis, Minn., and David W. Olsen, St. Paul, Minn. (both of Univac Park, St. Paul, Minn. 55116)

Filed Jan. 3, 1966, Ser. No. 518,169
7 Claims. (Cl. 242—55.12)

ABSTRACT OF THE DISCLOSURE

A magnetic tape transport utilizing a plurality of vacuum exhaust ports at the bottom of each tape loop box, said ports being dimensioned and positioned to prevent tape collapse or flutter.

This invention relates to magnetic tape transports and particularly to digital tape transport systems using vacuum chambers for providing low inertia lengths of tape buffering between high speed drive mechanisms and relatively slower speed supply and take-up mechanisms.

In various forms of information recording and reproduction techniques it is ordinarily required that a record bearing material be selectively passed across a read-write transducer. It has been found that maximum efficiency is achieved when tape, for example, is moved in short bursts so that discrete quanta of information can be recorded on or extracted from the tape. These quanta of information may be of variable lengths, but may take the form of a fixed conveniently or arbitrarily chosen amount of information which will be read into or from the recording material in a single operation. When such systems are employed, the operation thereof ordinarily necessitates accelerating the tape from rest to a full reading or recording speed, and this acceleration must be accomplished in as short a time as possible. Actual recording or reproduction of information cannot in fact take place until the tape or web has reached full speed. For any information operation performed prior to this full speed translation of the tape will result in an inaccurate reproduction of information on the record surface.

In most practical applications of recording or reproduction techniques, the tape is stored on a supply reel and the tape after passing through the recording or playback head is received by a take-up reel. Because of the amount of tape ordinarily required in practical applications, the supply and take-up reels will present relatively massive components in the system, whereby a relatively long time is required to accelerate these reels to full speed. Because of this consideration, prior art information reading and reproduction systems are relatively inefficient in operation and appreciable lengths of tape are wasted during the time required for the reels of tape to reach a desired operating speed.

For certain applications of magnetic tape systems, such as in digital computers, for example, the magnetic tape transport mechanisms must have the capability of operating bi-directionally and intermittently in order to be closely compatible with data transfer requirements of modern electronic data processing systems. The tape may have to be driven in one direction and then immediately reversed and driven in the other. Because no data transfer can be effected during start and stop times and since the start and stop distances generally reduce the effective density with which the data is packed on the tape, the start and stop times and distances must be minimized as far as possible. At the same time, high tape speeds, which are necessary to high data transfer rates, must be provided in both directions of movement. In order to meet these severe requirements for mechanical systems, there have been developed a number of tape transport mechanisms in which extremely close control of the tape speed in movement are obtained for most purposes. In typical applications, the reel mechanisms are isolated from the driving mechanisms by passing the tape through the vacuum chambers in such fashion that varying length loops of tape are provided in prescribed paths between the driving mechanism and the supply or take-up reel. For bi-directional operation, the driving mechanisms in the vacuum chambers may be symmetrically disposed relative to the supply and take-up reels. With a tape loop held in each of the vacuum chambers on opposite sides of the driving mechanism, which may typically be a conventional capstan mechanism, the tape alone is acted upon during acceleration and deceleration, independently of the motion of the associated supply and take-up reels. In such arrangements the tape is withdrawn directly from and supplied directly to the vacuum chambers, which provide buffering storage between the driving mechanism and the relatively slower acting, independently driven reels.

It has been known to provide tape handling apparatus with loop boxes of the tapered variety whereby the mouth of the boxes has the largest dimension opening and the closed end has the smallest dimension. For purposes of definition a tapered vacuum loop box is merely one that denotes a structure having a neck which is narrower than the mouth thereof whereby differing atmoshperic forces will be applied to the tape as the tape changes in location between the mouth and the neck of the box. In this type of loop box configuration, the amount of pressure differential across the tape loop varies as the tape moves upwardly or downwardly in the vacuum box. When the tape is high in the box, the radius of the loop is greater, hence a larger pressure differential exists across the tape. Conversely, as the tape moves downwardly in the vacuum box, the area of the tape exposed to the atmosphere and vacuum lessens thereby decreasing the pressure differential. In other words, the tape is subjected to a decreased pressure force when it is drawn into the box toward the tapered closed end. Accordingly, tape loop collapse is prevented by reason of the tapered sides of the boxes providing a gradually decreased area of tape loop. Where two pairs of vacuum loop boxes are utilized, one pair being spaced from the other pair, tape loop lengths are thereby controlled. As the capstan feeds tape, the vacuum boxes corresponding to that reel which is to wind the tape, receives additional buffer lengths. Tape loop bottoming or collapse is prevented since the tape loop narrows as it is drawn into the box. The further down it is drawn into the box, the smaller pressure differential exists across the tape. The loop is drawn into the box to a point where the tension in the tape caused by the capstans, tape frictional forces, and the like equals that caused by the pressure differential existing across the tape.

There are, however, disadvantages in using the tapered loop box variety. Tape friction, for example, is increased by reason of tape contact with the tapered surfaces of the boxes. Also, since one of the reasons for using multiple loop boxes is to store additional tape buffer lengths, rather than lengthening two individual boxes to the point where the height limitation presents a problem, the tapered loop boxes represent a decreasing area to the neck, smaller tape lengths will naturally result. Accordingly, pairs of tapered loop boxes of a certain height dimension will not accommodate as much tape as a pair of straight sided vacuum loop boxes. Hence straight sided boxes provide loop lengths accommodating longer loop lengths thus providing a physically smaller height dimension for the tape handler.

Where slack loops are employed in the tape transport system, some means must be provided for controlling the rate at which the supply reel unwinds the tape, and the rate at which the take-up reel winds the tape, to keep the slack loops at optimum length. One known method is to hold each of the slack loops in position in a separate vacuum column which is evacuated below the tape loop. Various methods for sensing the length or the slack loop in the vacuum column for controlling the loop length have been employed. Such methods heretofore used have generally involved switching means, that is either mechanically actuated by the tape loop or actuated in response to pressure changes occurring as the loop passes a particular point, the switching means being located at spaced points along the column. Whenever the loop becomes too short or too long or passes out of the region between the two switching means, the switching means is actuated to either speed up or slow down the associated reel until the loop is again brought within the space between the two switching means. A typical loop sensing apparatus is fully disclosed in the Reader Patent 3,199,800 issued Aug. 10, 1965.

In systems in accordance with the present invention, the above mentioned sensing technique and vacuum inlet port arrangement at one end of each adjacent pair of vacuum loop boxes, all connected to a common vacuum source is used.

A particular feature of the present invention includes a provision in the system of a novel arrangement of exhaust ports for controlling the pressure differentials across buffer tape loops.

In carrying out the present invention, there is utilized a tape storage means into which a length of tape can be drawn as a loop and from which the tape may be withdrawn in either of two opposite directions. The storage means comprises a first and a second loop box pair associated with one reel in which the loops of the tape can be fed lengthwise, and another pair of loop boxes associated with the other reel. A common vacuum source is connected to all of the vacuum loop boxes in the system for effecting the pressure supply to all of the loop boxes. No limitation is intended, however, to the use of a single vacuum source since a plurality of sources and appropriate duct work may be used as well. The arrangement is such that for "start" operations, all of the tape may be on the supply reel. A first vacuum loop box, of the first pair (hereinafter termed leg 1), has drawn into it a loop of tape by reason of the reduced air pressure or vacuum applied to the exhaust ports at the bottom of the loop box. As the length of tape in the first box increases and the loop falls below the largest of three exhaust ports, the pressure differential existing across the second loop in the adjacent box (referred to as leg 2), is effectively greater than the differential in leg 1, Accordingly, the second loop box having the greater pressure differential draws the additional length of tape into it but does not yet cover any of the exhaust ports. Since the supply reel is being rotated by the reel drive motor, only the loop in leg 1 will be drawn down past the large vacuum port. In other words, if the rate at which the tape is drawn from one reel exceeds that at which the tape is drawn over the other reel, the vacuum in the leg 1 draws the excess tape toward the bottom of the leg. When the loop moves down past the largest vacuum port of the multi-port configuration, some pressure loss occurs within the leg. The two smaller vacuum ports in the leg prevent loop collapse, due to their strategic placement. The vacuum in leg 2 being greater than that in leg 1, causes the tape to be drawn down further into leg 2. The tape then extends through the other two legs 3 and 4 without covering any of the exhaust ports.

Once the tape has been threaded through the machine as part of the "start" operation, the handler is ready to operate in the "run" condition. As the drive mechanism associated with the take-up mechanism is activated, the buffer loop covering the large vacuum port in leg 1 raises in the loop box. This occurs since the driver capstans are rotated to full speed almost instantaneously while the heavier reels require some longer period of time in which to accelerate to full speed. As a result, leg 3, which is associated with the take-up reel receives an additional buffer length of tape. The loop is drawn into the leg so as to expose the larger exhaust port, to atmospheric pressure. The tape will not collapse, however, because of the two smaller ports maintaining a vacuum. As the take-up reel achieves full speed, the loop from the outside loop box of the pair associated with the take-up reel (leg 4) is withdrawn first. However, the loop in leg 3 is maintained in a position covering the large exhaust port.

To operate in the reverse direction, the tape is stopped and the direction of rotation of the reel drive motors are reversed. Again the tape loops in the boxes will reposition themselves. Upon a "stop" operation the tape loops come to rest in a different position in the boxes than while in the "run" condition. The driver is then caused to rotate in the reverse direction to wind tape back onto the supply reel. During this "run" condition, the loop in the inside loop box of the pair associated with the supply reel, i.e. leg 2, is drawn below the large exhaust port in leg 2. When the tape is stopped and transported back onto the supply reel, the same operation and loop conditions occur. However, the loop lengths will not necessarily reposition themselves in the exact position as in the prior "stop" condition since the reels now contain different amounts of tape. Other factors influence the position of the tape loop lengths in the loop boxes as well. At the same time, however, there is no requirement that the loop lengths achieve the exact same position from one forward "run" operation to a subsequent one.

Accordingly it is an object of the present invention to provide an improved tape handling machine.

Another object of the present invention resides in the provision of a tape handling structure which is more simple, compact, and reliable than those of the prior art.

Still another object of the present invention resides in the provision of information handling apparatus employing vacuum loop boxes with a novel exhaust port arrangement.

A yet further object of this invention is to provide a tape storage means of the vacuum loop box type which is capable of maintaining its tape loop freely movable into and out of a plurality of communicating vacuum loop boxes which form a non-linear loop path.

Yet another object of the present invention is to provide tape transport equipment for manipulating rapidly and smoothly a recording medium in vacuum loop boxes.

Yet another object of the present invention is to provide a tape handling machine with a novel vacuum forming means in straight-sided loop boxes.

The present invention will be clearly understood when reference is made to the accompanying description in conjunction with the drawings, in which.

Figure 1:
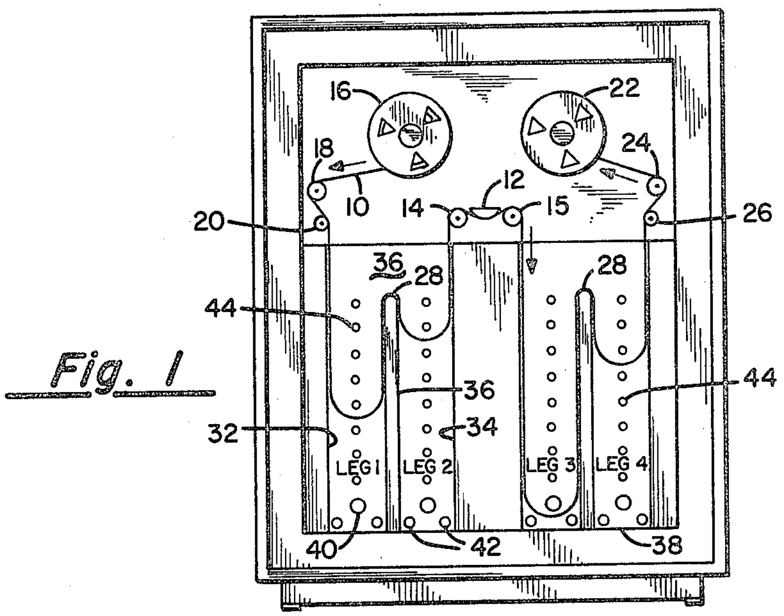
FIGURE 1 is a partial sectional view of a portion of a tape handler apparatus showing the principal features of the present invention with the buffer loops positioned during steady state "run" operations.

Referring to the tape transport system of FIGURE 1, the numeral 10 refers to magnetic tape which is transported past a transducer 12 which may be a well known read-write head and where the tape 10 is of the type utilized for recording as well as for writing information in the form of magnetic spots. The tape 10 may be transported in either direction by the driver capstans 14 and 15 with the velocity of the tape at all times being maintained by the speed of the capstans. The tape is fed from or to reel 16 which alternately serves as a supply reel or a take-up reel in the tape feeding system depending on the direction of rotation. The feed from reel 16 extends around idler pulleys 18 and 20 into the open end of a first vacuum loop box, hereinafter identified to as leg 1, then around a frictionless air bearing means 28, into a second vacuum loop box, hereinafter identified to as leg 2, around capstan 14, transducer 12, capstan 15, vacuum loop legs 3 and 4, respectively, and back to the reel 22 by way of the idler pulleys 24 and 26.

The first and second vacuum legs 1 and 2 are formed by side walls 30 and 32 in conjunction with the partition 34. Partition 34 extends only partially between the chambers formed by wall 30 and 32, back panel 36, and a front panel (not shown). Since the vacuum loop boxes referenced by legs 3 and 4 are similarily constructed, no further explanation is made. The vacuum boxes are constructed of straight sides, that is, the cross-dimension from wall 32 to partition 34, from partition 34 to wall 30 and from back panel 36 to the front panel are of unvarying cross-dimensions.

The tape is stored on and transported between the tape reels 16 and 22 which are movably secured to rotating hubs. The hubs are driven by reel drive motors (not shown) in a conventional manner. The tape, in passing from one reel to the other extends through an operational zone including the magnetic transducer head 12. The vacuum loop legs are arranged to maintain buffer loops in the tape between the operational zone and the respective reels. A pressure differential across the tape loops in the legs keeps the tape in tension and provides an adequate supply of tape for "start" operations in either forward or reverse directions. Suitable sensing means disposed behind the panel 36 (not shown) sense the lengths of the loop in the legs and provides through suitable controls the power drive variable speed control for the reels. Movement of the tape through the operational zone is effected by the drivers or capstans 14 and 15, rotatable in opposite directions, by suitable capstan driving motors.

As illustrated, the reel hubs are spaced apart in the machine with the capstans and the transducer housing located between them. No intension, however, is made to limit the configuration to two capstans. One could be satisfactory. In normal operation, one of the capstans rotates counter clockwise and the other capstans rotates clockwise at the same time and may be also controlled to be either both disengaged or alternately engaged so that the tape is driven in a forward direction by one capstan toward one reel or in a reverse direction toward the other reel.

Disposed in proximity to the closed ends 38 of each of the vacuum loop boxes are vacuum forming means consisting of one large port exhaust 40 in the back panel 36 and two smaller exhaust ports 42 located below and to either side of port 40. A suitable port area ratio between the larger port 40 and the sum of the two smaller ports 42 has been found to be 2:1. That is, for each chamber, $A_{40}/A_{42}+A_{42}$ is 2. By designing the ports with at least the area ratio of 2:1, the effective pressure differential across the loops in legs 1–4 will provide the desired loop control at all times. However, it is to be understood that a ratio of 2:1 is not absolutely critical and that ratios different from 2:1 may be utilized depending upon the loop control characteristics desired. By providing the arrangement of exhaust ports described herein, problems found in prior art tape handlers caused by "bottoming" or tape collapse are obviated. The novel port arrangement of this invention insures that the tape loop will always be subject to at least some pneumatic force in each loop box leg.

*Operation*

Figure 2:
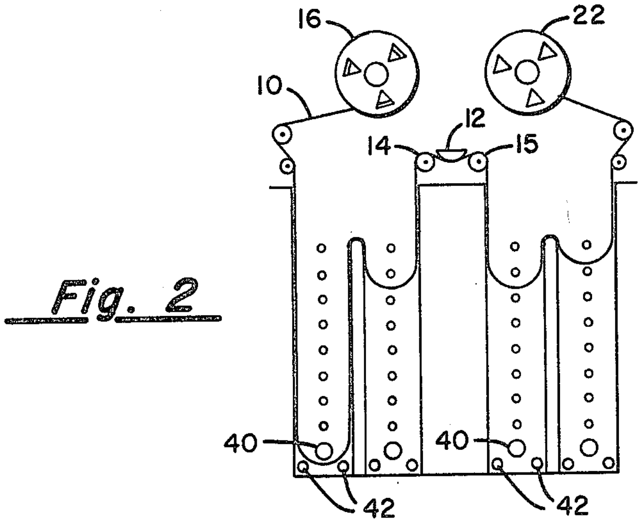
FIGURE 2 is a schematic illustration of the vacuum loop boxes of the present invention with the buffer loops positioned during a "start" condition of the machine.

Referring to FIGURE 2 and assuming that the machine is in the "start" condition, the loop in leg 1 will expose the large port 40 to atmospheric pressure while the loops in legs 2, 3 and 4 are in varying positions. As the tape is caused to move from left to right the capstan 15 feeds tape into leg 3 to the extent of uncovering the large port 40 therein. The loops in legs 1 and 2 move upwardly as shown in FIGURE 1 and assume that approximate position during tape transport. As the loop uncovers the large port in leg 3 the resultant vacuum loss in the leg is such that there is a greater vacuum in leg 4. That is to say, since the vacuum below the loop is reduced, a smaller pressure differential across the tape. However, the vacuum below the tape in leg 4 is still large, and consequently, the pressure differential across the tape is greater in leg 4 than in leg 3. Therefore the loop in leg 4 moves downwardly to the point where the now fully accelerated take-up reel 22 rotating at the same speed as the capstan draws tape from leg 3. The loop in leg 3, however, will remain below the larger port 40 therein and is prevented from collapsing by reason of the smaller ports. As mentioned, the take-up reel 22 is rotating at the same speed as the driving capstan; consequently, the loops in leg 3 and 4 position themselves as shown in FIGURE 1. The loops in legs 1 and 2 assume somewhat the position shown, the loops lengths being determined by the sensing equipment apparatus associated with the sensing ports 44 of the vacuum boxes. Should the loop in leg 1 raise in the box, a signal produced by the sensing apparatus causes the reel motor driving reel 16 to run faster and provide a longer loop in leg 1. Details of suitable loop position sensing devices are fully shown in the Reader Patent 3,199,800 issued Aug. 10, 1965.

As is evident from the preceding description, tape tension is maintained substantially constant by the use of straight-sided vacuum loop boxes. At only two positions does the tape tension undergo a change. Those positions or occurrences take place when the tape loop passes below the large exhaust ports 40 and when the tape raises to the top of the vacuum leg where effectively the radius and consequently the area of the loop changes. Obviously at all other points along the column, the loop maintains a substantially constant radius and hence the tape tension remains constant. The apparent advantages of maintaining constant tape tension are the elimination of tape flutter and read-write interferences which may otherwise occur from changing tape tensions in the record medium. These are some of the apparent advantages over tapered loop boxes wherein the constantly changing tape loop area may enhance the above-mentioned undesirable effects.

Accordingly, there has been provided a tape handling machine wherein twice the buffer length of tape over conventional arrangements is provided by utilizing pairs of straight-sided vacuum loop boxes containing a novel vacuum port configuration for maintaining loop control in each of the loop boxes especially critical during acceleration and deceleration operations of the machine.

It is understood that suitable modifications may be made in the method as disclosed provided that such modifications come within the spirit and scope of the appended claims. Having now, therefore, fully illustrated and described my invention, what we claim to be new and desire to protect by Letters Patent is:

1. A tape feeding apparatus utilizing a capstan to transport tape past an information processing station, the apparatus also having a supply and take-up reel and means for storing lengths of tape between each of said reels comprising:
   (a) first and second pairs of vacuum chamber means associated respectively with each of said reels, said chamber means having an open end for receiving a tape loop;
   (b) a first exhaust port arranged in one wall of each of the chamber means and located a predetermined depth within the chamber means from the open end;
   (c) second and third exhaust ports located in said wall of each of the chamber means on either side of said first exhaust port and at a depth within the chamber means which is greater than the depth of said first exhaust port such that when the tape drops to a position to expose said first exhaust port to atmospheric pressure, said second and third exhaust ports continue to exert pneumatic forces on said tape.

2. The invention of claim 1 wherein the first exhaust port associated with each of the chamber means has a greater area than either the second or third exhaust port.

3. The invention of claim 1 wherein said chamber means have an unvarying cross-dimension.

4. The invention of claim 1 wherein said first exhaust port has an area at least equal to the combined areas of the second and third exhaust ports.

5. The invention of claim 1 wherein the exhaust ports are located in relatively close proximity to the end of the chamber means opposite that of the open end.

6. In a digital tape transport:

(a) a tape supply and take-up means;

(b) an information processing station;

(c) pairs of vacuum loop box means for receiving a tape loop and having a closed end, said boxes having an unvarying cross-dimension between the mouth and the closed end;

(d) vacuum forming means disposed in close proximity to the closed end of the boxes, said vacuum forming means comprising at least one large opening and at least two smaller openings, the smaller openings being located closer to the closed end of the boxes than said large opening and to either side thereof;

(e) means coupled to the vacuum forming means for reducing pressure within said boxes so that said tape loop has a differential pressure on opposed sides thereof for positioning said loop, the force exerted on said tape by exhausting air through said two smaller openings serving to stabilize said tape whenever said tape drops to a level exposing said first opening to atmospheric pressure.

7. The invention of claim 6 wherein the area of the large opening is at least equal to the combined areas of the smaller openings.

References Cited

UNITED STATES PATENTS 3,199,800 8/1965 Reader ____________ 242—55.12
3,202,373 8/1965 Reader ____________ 242—55.12

LEONARD D. CHRISTIAN, *Primary Examiner.*